(12) United States Patent
Laporte et al.

(10) Patent No.: US 10,488,162 B2
(45) Date of Patent: Nov. 26, 2019

(54) TARGET LAUNCHING MACHINE WITH VARIABLE ORIENTATION

(71) Applicant: LAPORTE HOLDING (SAS), Biot (FR)

(72) Inventors: Jean-Michel Laporte, Biot (FR); Jean-Marc Fouques, Antibes (FR)

(73) Assignee: LAPORTE HOLDING (SAS), Biot (FR)

( * ) Notice: Subject to any disclaimer, the term of this patent is extended or adjusted under 35 U.S.C. 154(b) by 0 days.

(21) Appl. No.: 15/988,803

(22) Filed: May 24, 2018

(65) Prior Publication Data

US 2018/0372459 A1 Dec. 27, 2018

(30) Foreign Application Priority Data

May 24, 2017 (FR) ...................................... 17 54610

(51) Int. Cl.
*F41J 9/18* (2006.01)
*F41J 9/30* (2006.01)
*F16M 11/20* (2006.01)

(52) U.S. Cl.
CPC . *F41J 9/30* (2013.01); *F41J 9/18* (2013.01); *F16M 11/2007* (2013.01)

(58) Field of Classification Search
CPC ......... F41J 9/18; F41J 9/30; F41J 9/32; A63B 69/40; A63B 69/408
USPC .................................................... 124/6, 8, 9
See application file for complete search history.

(56) References Cited

U.S. PATENT DOCUMENTS

| 1,369,948 | A | * | 3/1921 | Vickery | ..................... F41J 9/30 124/9 |
| 2,364,951 | A | * | 12/1944 | Corte | ...................... F16C 19/18 74/425 |
| 3,070,082 | A | * | 12/1962 | Foster | ....................... F41J 9/20 124/8 |
| 3,677,257 | A | * | 7/1972 | Segerkvist | ................. F41J 9/30 124/8 |

(Continued)

FOREIGN PATENT DOCUMENTS

| FR | 2 141 160 | 1/1973 |
| FR | 2 493 505 | 5/1982 |

(Continued)

OTHER PUBLICATIONS

Combined Search and Examination Report under Sections 17 and 18(3) from corresponding Application No. GB 1808522.5, dated Aug. 7, 2018, pp. 1-5, Intellectual Property Office, Newport, South Wales.

*Primary Examiner* — Alexander R Niconovich
(74) *Attorney, Agent, or Firm* — Hauptman Ham, LLP (57) ABSTRACT

A machine for launching targets, comprising a base on which an assembly comprising a launch mechanism and a drum for storing targets is arranged. The assembly is configured to be mobile with respect to the base, wherein it comprises a tilting mechanism comprising a main tilting system providing a main mobility of the assembly with respect to the base consisting of a curved slide rigidly connected to one out of the base and the assembly, and an element guided by the slide in a single degree of freedom in translation along the slide and rigidly connected to the other out of the base and the assembly. The slide and the guided element are mounted movably in translation along the slide.

14 Claims, 8 Drawing Sheets

(56) References Cited

U.S. PATENT DOCUMENTS

| | | | | |
|---|---|---|---|---|
| 3,923,033 A * | 12/1975 | Laporte | F41J 9/24 | 124/8 |
| 3,971,357 A * | 7/1976 | LaPorte | F41J 9/24 | 124/8 |
| 4,300,520 A * | 11/1981 | Laporte | F41J 9/32 | 124/9 |
| 4,481,932 A * | 11/1984 | Olson | F41J 9/20 | 124/43 |
| 4,706,641 A * | 11/1987 | Cote | F41J 9/30 | 124/32 |
| 5,771,874 A * | 6/1998 | Kohler | F41J 9/30 | 124/51.1 |
| 8,074,633 B2 * | 12/2011 | Grant | A63B 69/406 | 124/78 |
| 9,022,016 B1 * | 5/2015 | Hafer | F41B 4/00 | 124/6 |
| 9,389,050 B1 * | 7/2016 | Chen | F41J 9/20 | |
| 9,789,379 B1 * | 10/2017 | Bynum | A63B 69/406 | |
| 10,130,865 B2 * | 11/2018 | Paulson | A63B 69/406 | |
| 2005/0103319 A1 * | 5/2005 | Hudson | A63B 69/40 | 124/78 |
| 2006/0065258 A1 * | 3/2006 | Lovell | F41J 9/24 | 124/9 |
| 2011/0260404 A1 * | 10/2011 | Laporte | F41J 1/01 | 273/362 |
| 2012/0138034 A1 * | 6/2012 | Whidborne | F41J 9/18 | 124/8 |
| 2013/0104867 A1 * | 5/2013 | Laporte | F41J 9/18 | 124/41.1 |
| 2013/0112181 A1 * | 5/2013 | Laporte | F41J 9/18 | 124/6 |
| 2013/0118464 A1 * | 5/2013 | Laporte | F41J 9/18 | 124/42 |
| 2013/0118467 A1 * | 5/2013 | Laporte | F41J 9/16 | 124/81 |
| 2013/0125869 A1 * | 5/2013 | Laporte | F41J 9/18 | 124/47 |
| 2013/0133636 A1 * | 5/2013 | Rennert | F41J 9/18 | 124/80 |

FOREIGN PATENT DOCUMENTS

| | | |
|---|---|---|
| FR | 2 733 043 A1 | 10/1996 |
| GB | 1 553 851 | 10/1979 |

* cited by examiner

TARGET LAUNCHING MACHINE WITH VARIABLE ORIENTATION

RELATED APPLICATIONS

The present application claims the priority of French Application No. 1558729, filed May 24, 2017, which is incorporated herein by reference in its entirety.

TECHNICAL FIELD

The present invention relates in particular to a machine for launching targets and precisely to the device for storing the targets of such a machine.

A preferred use relates to the industry of shooting sports, and more precisely the clay target shooting industry.

PRIOR ART

The field of clay target shooting is changing by proposing varied target trajectories. To make themselves, mechanisms give launchers adjustable orientations. The machines for launching targets comprise a base 2 above which there is an assembly 1 comprising a device for projecting targets, comprising in particular a projection plate and an arm for launching the target, and a drum 3 for storing targets. This assembly 1 is mounted pivotably with respect to the base 2 via a pivot link. The pivot link comprises a rotary shaft 4. The pivoting is guided by an oblong hole 5 formed in the base 2 and in which a protruding portion 6 rigidly connected to the assembly 1 moves. The function of the oblong hole 5 is to guide the protruding portion 6 during the rotation of the assembly 1 about the rotary shaft 4. The oblong hole 5 and the protruding portion 6 have a sliding pivot link that allows two degrees of freedom, one in translation and the other in rotation. The rotary shaft 4 forms the pivot link allowing a degree of freedom in rotation. The rotary shaft 4 allows the bearing of loads, contrary to the oblong hole 5 and the protruding portion 6, which do not bear a load and do not have a supporting function.

Figure 1:
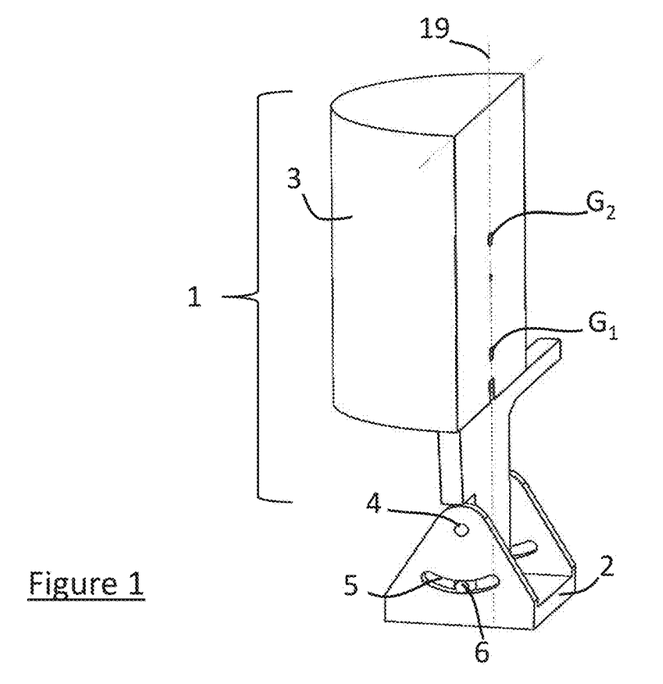
FIGS. 1 and 2: cross-sectional side views of a machine for launching targets according to the prior art in a central position in FIG. 1 and in a position tilted to the left in FIG. 2.
Figure 2:
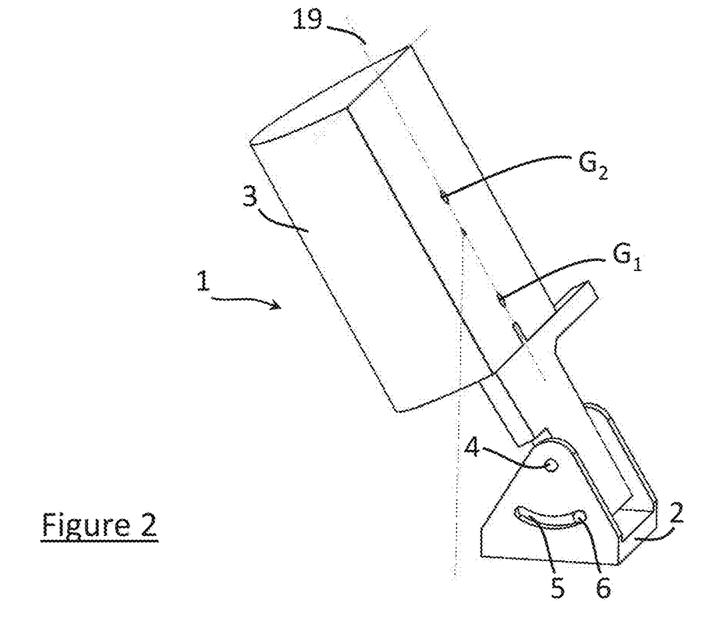

A machine of the prior art is shown in FIGS. 1 and 2.

Due to the design of the machines, the rotary shaft 4 that is located at the junction between the assembly 1 and the base and necessarily rather close to the ground. The principle of this pivoting is simple but limiting. Indeed, during the inclination of the assemble 1, the centre of gravity of the machine moves away from the longitudinal axis 19 of the machine. According to the degree of inclination, the machine can become cantilevered. Moreover, the phenomenon is intensified with the increase in the load to be moved when the drum 3 is filled with targets. According to the level to which the drum is loaded, the centre of gravity moves along the longitudinal axis 19 of the machine correspondingly limiting the pivoting of the machine. The target capacity of this type of machine is therefore reduced, and moreover, the anchoring of the base must be reinforced in order to compensate for the instability.

There is a need to propose a machine for launching targets that allows both varied target trajectories and increased target-storage capacities.

DISCLOSURE OF THE INVENTION

For this purpose, the present invention proposes a machine for launching targets, comprising a base on which an assembly comprising a launch mechanism and a drum for storing targets is arranged, the assembly being configured to be mobile with respect to the base.

Advantageously, said machine comprises a tilting mechanism comprising a main tilting system providing a main mobility advantageously in rotation of the assembly with respect to the base, the main system comprising, and preferably consisting, of at least one curved slide rigidly connected to one out of the base and the assembly and an element guided by the slide in one degree of freedom, in the form of a movement that can be equated to a preferably curved translation, that is to say, a guided tilting, along the slide and rigidly connected to the other out of the base and the assembly.

Advantageously, the tilting device does not comprise a physical pivot link at the geometric axis of rotation corresponding to the movement of rotation.

Via this provision of the invention, the machine does not comprise a rotary shaft and the axis of rotation of the tilting of the assembly with respect to the base can be defined more freely and in particular near or at the centre of gravity of the machine.

Advantageously, the tilting mechanism is configured to allow an additional mobility of the assembly with respect to the base.

The tilting mechanism comprises a main system providing the main mobility and advantageously an additional system providing an additional mobility in rotation.

Preferably, the additional system does not comprise a physical pivot link at the geometric axis of rotation corresponding to the additional movement.

Another object of the invention is a machine for launching targets, comprising a base on which an assembly comprising a launch mechanism and a drum for storing targets is arranged, the assembly being configured to be mobile in rotation with respect to the base, wherein the geometric axis of the rotation with respect to the base is placed at an intermediate height level between that of a centre of gravity of the machine when the drum is empty of targets and that of a centre of gravity of the machine when the drum is totally filled with targets. The invention also relates to a method for positioning the geometric axis of rotation with respect to the base at an intermediate height level between that of a centre of gravity of the machine when the drum is empty of targets and that of a centre of gravity of the machine when the drum is totally filled with targets. The height is meant of the dimension in the direction of gravity. The position of the centres of gravity is advantageously defined when the longitudinal direction of the drum is directed in this direction.

BRIEF DESCRIPTION OF THE DRAWINGS

The goal, objects, as well as the features and advantages of the invention will be clearer from the detailed description of an embodiment of the latter that is illustrated by the following accompanying drawings in which.

DETAILED DISCLOSURE OF SPECIFIC EMBODIMENTS

Before starting a detailed review of embodiments of the invention, optional features that can optionally be used in combination or alternatively are mentioned below.

First of all, it is recalled that the invention relates in particular to a machine for launching targets, comprising a base 2 on which an assembly 1 comprising a launch mechanism 7 and a drum 3 for storing targets is arranged, the assembly being configured to be mobile with respect to the base 2, characterised in that said invention comprises a tilting mechanism comprising a main tilting system providing a main mobility of the assembly 1 with respect to the base 2 consisting of a curved slide 20 rigidly connected to one out of the base 2 and the assembly 1 and an element guided by the slide 20 in a single degree of freedom in translation along the slide 20 and rigidly connected to the other out of the base 2 and the assembly 1, advantageously the slide 20 and the guided element being mounted movably in relative translation along the slide 20.

Advantageously, according to preferred but non-limiting alternatives, the invention is such that:
- the main system does not comprise a pivot link, in particular at the geometric axis of rotation;
- the tilting mechanism comprises an additional system providing an additional mobility, preferably in rotation of the assembly 1 with respect to the base 2 consisting of a curved slide 20 rigidly connected to one out of the base 2 and the assembly 1, and an element guided by the curved slide 20 in a single degree of freedom, which can be equated to a movement in translation along a curved trajectory, forming a degree of tilting, along the slide 20 and rigidly connected to the other out of the base 2 and the assembly 1, advantageously the slide 20 and the guided element being mounted movably in translation along the slide 20;
- the main tilting system and the additional system are mounted in series between the base 2 and the assembly 1; they thus form two successive and different degrees of freedom between the base and the assembly; an intermediate member can be used to form a portion of the main tilting system and, at the same time, a portion of the additional system. The additional system maybe in relation to the base 2 or in relation to the assembly 1, the main system adopting an inverse mounting, either in relation to the assembly 1 or in relation to the base 2, respectively.
- the additional system does not comprise a pivot link, in particular at the geometric axis of its rotation;
- the guided element comprises a series of rollers 21 cooperating with the slide 20;
- a main device for adjusting the inclination of the main system comprising an adjustable helical slide slidingly fastened at at least one point onto the slide 20 and at at least one point onto the one out of the base 2 and the assembly 1 to which the guided element is rigidly connected;
- the main system is configured to impart a tilting of the assembly 1 relative to the base 2 according to a curve C1 centred on a straight line X1 that intersects, at a point G3, a longitudinal axis 19 of the machine that passes through the centre of gravity G1 of the machine when the drum 3 is empty and through the centre of gravity G2 of the machine when the drum 3 is full.
- the curve C1 is configured in order for the point G3 to be formed at an intermediate height level between G1 and G2 or on the segment [G1G2];
- the curve C1 is configured in order for the distance [G1G3] to be greater than the distance [G2G3];
- the tilting mechanism comprises a second additional system consisting of a curved slide 20 rigidly connected to one out of the base 2 and the assembly 1, and an element guided by the slide 20 in a single degree of freedom in translation along the slide 20 and rigidly connected to the other out of the base 2 and the assembly 1, the slide 20 and the guided element being mounted movably in translation along the slide 20;
- the two guided elements are arches 17 comprising, respectively, a series of rollers 21 respectively sliding in each slide 20;
- the additional system is configured to impart a tilting of the assembly relative to the base 2 according to a curve C2 centred on a straight line X2 that intersects, at a point G3, a longitudinal axis 19 of the machine that passes through the centre of gravity G1 of the machine when the drum 3 is empty and through the centre of gravity G2 of the machine when the drum 3 is full;
- the curve C2 is configured in order for the point G3 to be formed on the segment [G1G2];
- the curve C2 is configured in order for the distance [G1G3] to be greater than the distance [G2G3];
- the machine comprises a device for additional adjustment of the additional system comprising a pinion 14 rigidly connected to the base 2 configured to cooperate with a rack 15 arranged on an arch 17.

A machine according to the prior art is illustrated in FIGS. 1 and 2.

The machine for launching targets of the prior art comprises a base 2 above which there is an assembly 1 comprising a device for projecting targets, comprising in particular a projection plate and an arm for launching the target, and a drum 3 for storing targets. This assembly 1 is mounted pivotably with respect to the base 2 via a pivot link. The pivot link comprises a rotary shaft 4. The pivoting is guided by an oblong hole 5 formed in the base 2 and in which a protruding portion 6 rigidly connected to the assembly 1 moves. The only function of the oblong hole 5 is to guide the protruding portion 6 during the rotation of the assembly 1 about the rotary shaft 4. The oblong hole 5 and the protruding portion 6 have a sliding pivot link that allows two degrees of freedom: one in translation and the other in rotation. The rotary shaft 4 forms the pivot link allowing a degree of freedom in rotation. The rotary shaft 4 allows the bearing of loads, contrary to the oblong hole 5 and the protruding portion 6, which do not bear a load and do not have a supporting function.

The centre of gravity of the machine moves along a longitudinal axis 19 according to the weight of the machine, more precisely in particular according to the level to which the drum 3 is loaded. Two extreme load levels of the drum 3 can be easily defined, namely when the drum 3 contains the maximum capacity of targets, the drum 3 is qualified as full and when the drum 3 contains the minimum capacity of targets 3, the drum 3 is qualified as empty.

The longitudinal axis 19 of the machine is meant for a machine in a central position, that is to say, not inclined. The longitudinal axis 19 of the machine corresponds more precisely to the longitudinal axis of the drum 13, it can be the axis or rotation of the drum 3.

The centre of gravity thus varies between two extreme positions corresponding to the two extreme load levels of the drum 3, the point G1 when the drum 3 is empty and the point G2 when the drum 3 is full.

It is easily understood that with a machine of the prior art as illustrated in FIGS. 1 and 2, the inclination of the assembly with respect to the base 2 is limited and/or imposes high stresses, especially when the drum 3 is full.

According to the invention, a machine for launching targets comprises an assembly 1 formed by a drum 3 for storing targets, a mechanism 7 for launching targets, and a base 2. The assembly 1 is mobile relative to the base 2. This mobility preferably comprises a rotation.

The launch mechanism 7 conventionally comprises a launch zone (not shown) intended to receive the target to be launched coming from the drum 3, a motor (not shown) actuating a launch arm (not shown) intended to project the target located in the launch zone. The drum 3 is typically a set of columns directed in parallel and each suitable for receiving targets in a stack. The drum 3 can be mounted with rotation according to the direction of the columns in such a way as to contribute to the sequential delivery of the targets to the launch zone, and the latter can comprise a launch plate.

Figure 3:
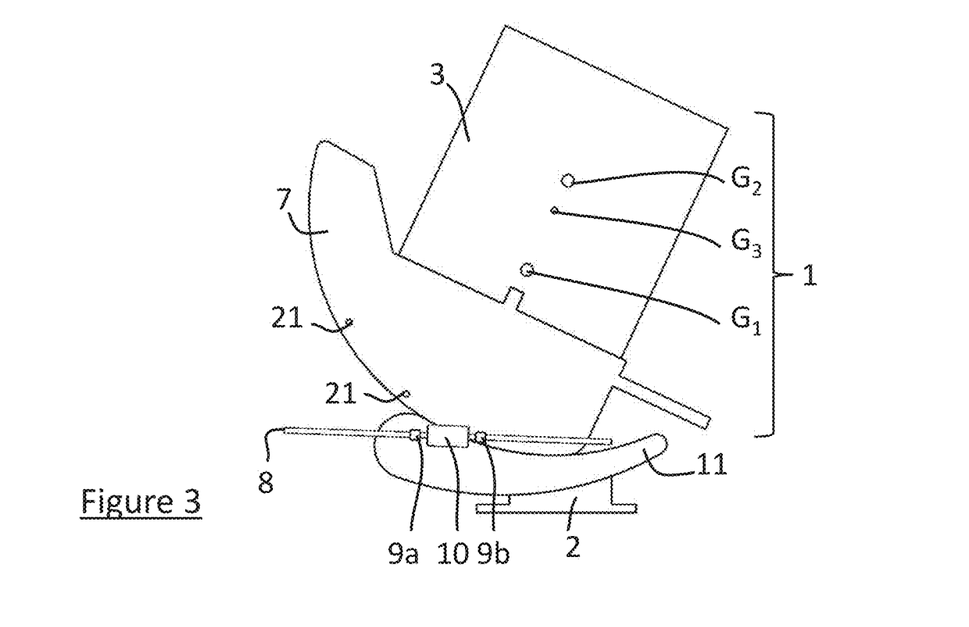
FIGS. 3 to 5: side views of a machine according to a first embodiment of the invention comprising a tilting mechanism, the assembly being in a position offset towards the right in FIG. 3, in a central position in FIG. 4, and in a position offset to the left in FIG. 5.
Figure 4:
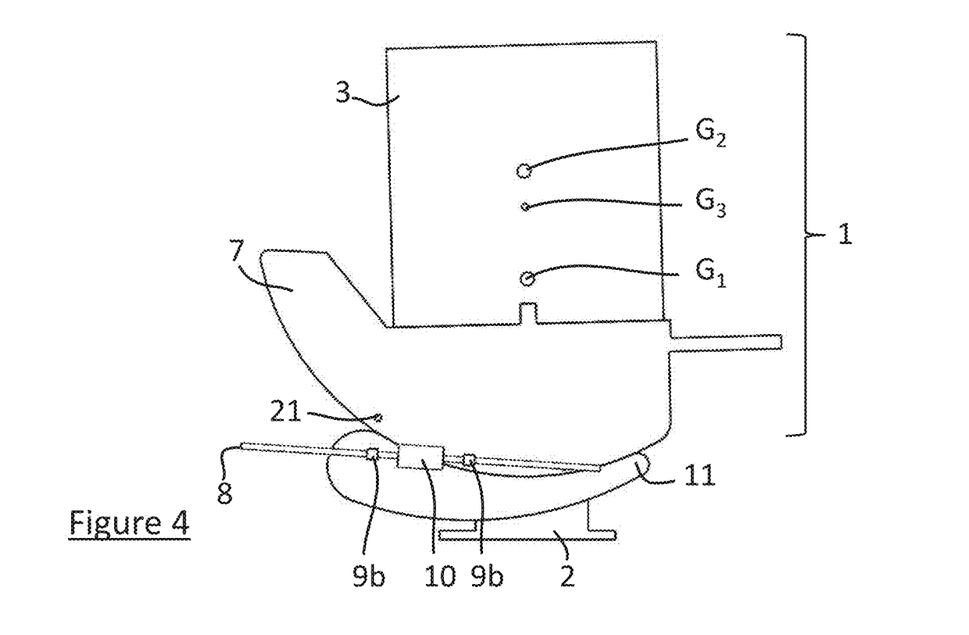
Figure 5:
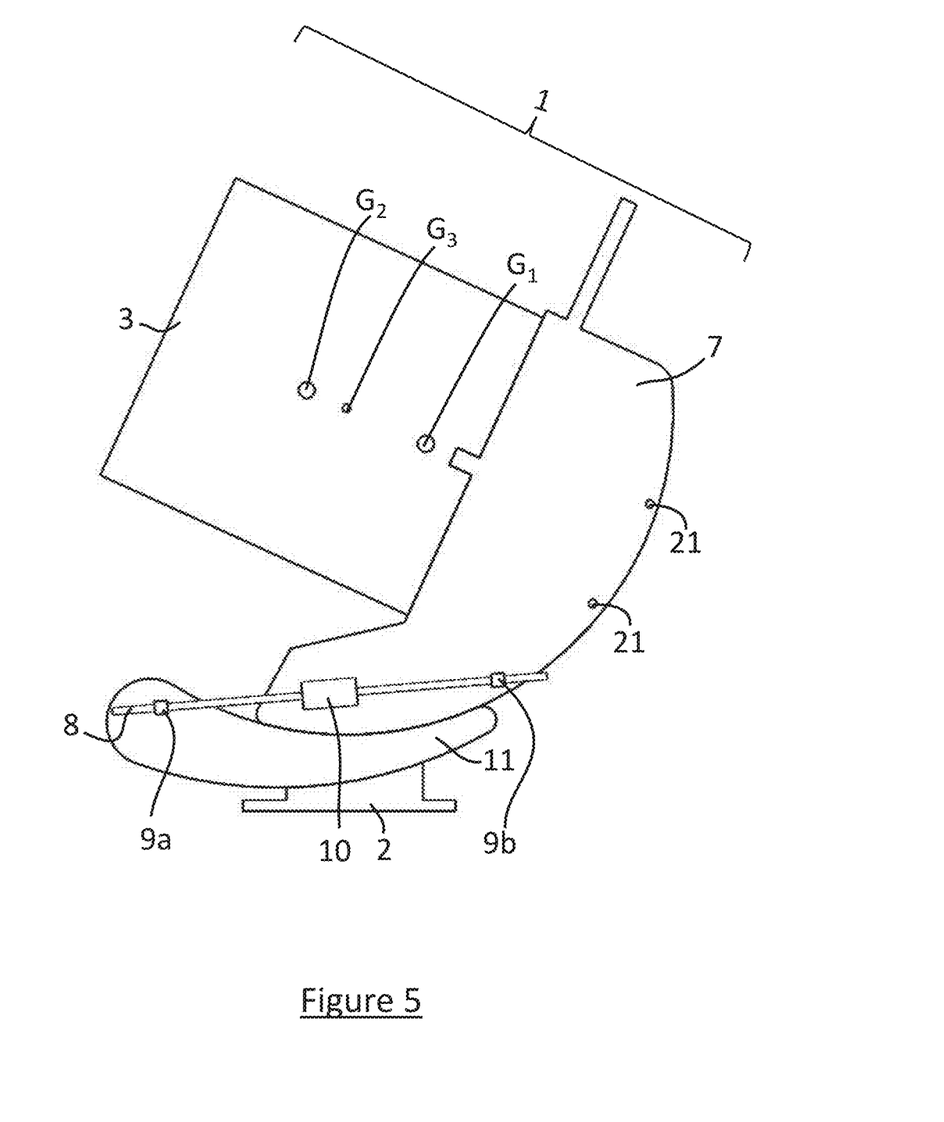

According to an embodiment illustrated in FIGS. 3 to 5, the launching machine comprises a base 2 on which the assembly comprising the drum 3 and the launch mechanism 7 as described above rests. According to the invention, the machine comprises a tilting mechanism intended to allow the inclination of the assembly 1 relative to the base 2 in order to allow varied target-shooting directions.

The tilting mechanism is configured to allow a mobility of the assembly relative to the base 2 in a main degree of freedom, advantageously a first rotation about a first geometric axis. Advantageously, the tilting mechanism is configured to allow an additional mobility of the assembly relative to the base 2, advantageously a second rotation about a second geometric axis that can preferably be perpendicular to the first axis.

The tilting mechanism thus comprises a main system providing the main mobility and an additional system providing the additional mobility.

The main system comprises or even consists of at least one curved slide 20 rigidly connected to one out of the assembly 1 and the base 2 and an element guided by the slide 20 in a single degree of freedom in translation along the slide 20 and rigidly connected to the other out of the assembly and the base 2. The main system is configured to allow a mobility of the assembly relative to the base 2 in translation. Since the slide is curved, the degree of freedom obtained is a tilting. If the slide is in the shape of an arc of a circle, the tilting has a circular trajectory.

Rigidly connected means an element that, in its operation, is linked either via contact or via an intermediary to another member.

In FIGS. 3 to 5, the machine only comprises the main system. A slide 20 is rigidly connected to the base 2 while a series of rollers 21 is rigidly connected to the assembly and more specifically to the launch mechanism 7, via a plate rigidly connected to this mechanism.

The guided element advantageously extends over the entire length of the slide 20 while defining a tilting curve. The slide 20 and the guided element are mounted movably in translation along the slide.

According to the invention, the main system does not comprise a rotary shaft about which a pivot link would be formed like in the prior art. The absence of a physical rotary shaft for the tilting of the assembly relative to the base 2 gives greater freedom of angulation of the assembly.

According to the invention, the tilting mechanism comprises a main device for adjusting the inclination of the main system. The main device for adjusting the inclination comprises, according to a possibility illustrated in FIGS. 3 to 12, an adjustable helical slide 20. The slide comprises a threaded rod 8 advantageously provided at one end with am actuation wheel 16 and at least one nut 9a and advantageously at least one bearing 9b.

Preferably, the nut 9a is rigidly connected to the slide 20 and the bearing 9b is rigidly connected to the assembly. The nut 9a is fastened to the slide 20 with a mobility in rotation about the axis of fastening to the slide 20. The bearing 9b is a part, for example a rectangular parallelepiped, pierced by a hole allowing the threaded rod 8 to pass through. The bearing 9b is fastened to a stud 18 providing the bearing 9b with a mobility in rotation about the axis of fastening of the stud 18 to the assembly. The nut 9a is a part, for example a rectangular parallelepiped, pierced by a threaded hole that cooperates with the threaded rod 8. The nut 9a allows helical translation of the threaded rod 8 while the bearing 9b provides the guiding of the threaded rod 8 in translation.

Advantageously, the threaded rod 8 is rigidly connected to a sleeve 10 arranged in particular in the central portion of the rod 8 and allowing manual actuation of the helical slide 20 in addition or alternatively to the wheel 16.

According to an advantageous possibility of the invention, the assembly comprises a plurality of studs 18 preferably positioned near the series of rollers 21 cooperating with the slide 20. According to the inclination desired for the assembly relative to the base 2, the bearing 9b is fastened onto one of the studs 18. A plurality of possibilities for mounting the bearing are illustrated in FIGS. 3 to 5. Thus, in general, the means for adjusting the inclination can be connected to various locations of at least one out of the base and the assembly in such a way as to provide various configurations of adjustment of the inclination.

FIGS. 3 to 12 only show a main system, but a complete machine preferably comprises an additional main system. That is to say, the machine comprises at least two slides 20 rigidly connected to the base 2 and two guided elements, more precisely two series of rollers 21 rigidly connected to the assembly.

Preferably, the machine only comprises one main adjustment device actuating the main system; the additional main system follows the actuation of the main system.

Figure 8:
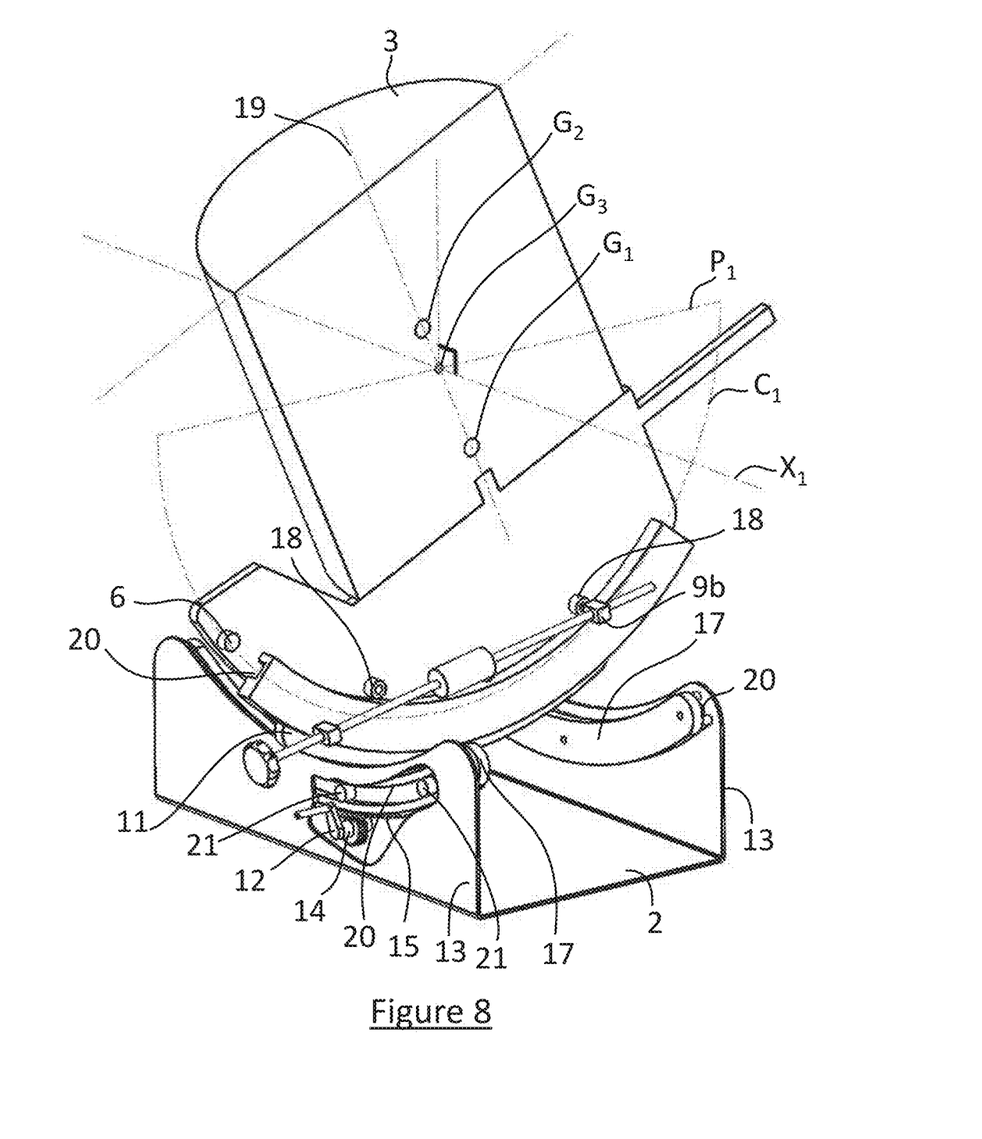
- FIG. 8: Front view of a machine according to an alternative of the second embodiment illustrated in FIGS. 6 and 7, illustrating the mobility of the tilting mechanism.

The main system, and optionally the additional main system, is configured to impart a translation on the assembly along a curve C1 as illustrated in FIG. 8.

The curve C1 is, according to a preferred embodiment, an arc of a circle. The curve C1 is inscribed in a plane P1 advantageously comprising the longitudinal axis 19 of the machine. The curve C1 is centred on an axis X1 perpendicular to the plane P1 and intersecting the longitudinal axis 19 at the point G3. The point G3 is defined advantageously in such a way as to be within the segment [G1G2]. Advantageously, in order to provide constant actuation of the tilting mechanism regardless of the load level of the drum 3, the point G3 must be positioned closer to the point G2 than to the point G1 that is to say closer to the centre of gravity of the machine when the drum 3 is full than to the centre of gravity of the machine when the drum 3 is empty. It can be stated that [G1G3]>[G2G3].

According to a complementary embodiment illustrated in FIGS. 6 to 12, the machine comprises an additional system providing the additional mobility.

The additional system comprises or consists of a curved slide 20 rigidly connected to one out of the assembly and the base 2 and an element guided by the slide 20 in a single degree of freedom in translation along the slide 20 and rigidly connected to the other out of the assembly and the base 2. The additional system is configured to allow mobility of the guided element in translation along the slide 20.

In FIGS. 6 to 12, a slide 20 is rigidly connected to the base 2 while an arch 17 provided with a series of rollers 21 is rigidly connected to the assembly. According to this embodiment, the arch 17 is rigidly connected to an intermediate base 11 on which the slide 20 of the main system is arranged.

The arch 17 advantageously extends over the entire length of the slide while defining a tilting curve.

According to the invention, the additional system does not comprise a rotary shaft about which a pivot link would be formed like in the prior art. The absence of a physical rotary shaft for the tilting of the assembly relative to the base 2 gives greater freedom of angulation of the assembly.

The base 2 advantageously has the shape of a cradle. The base comprises two flanges 13 mounted in parallel to each other and substantially perpendicularly on a base of the base 2. The flanges 13 have the shape of a cradle substantially complementary to the curvature of the slide 20 of the additional system.

Advantageously, the machine as illustrated comprises a second additional system. That is to say, the machine comprises two slides 20 rigidly connected to the base 2, more preferably respectively mounted on a flange 13 of the base 2 and two guided elements, more precisely two arches 17 each provided with a series of rollers 21. The arches 17 are rigidly connected to the assembly 1 in such a way as to drive the tilting thereof. The arches 17 are fastened via any means to the base of the slide 20 of the main system, in such a way as to form a coherent welded assembly. Preferably according to this embodiment, the slide 20 of the main system is rigidly connected to an intermediate base 11 and the arches 17 are also rigidly connected to this intermediate base 11.

According to the invention, the tilting mechanism comprises an additional device for adjusting the inclination of the additional system.

Figure 6:
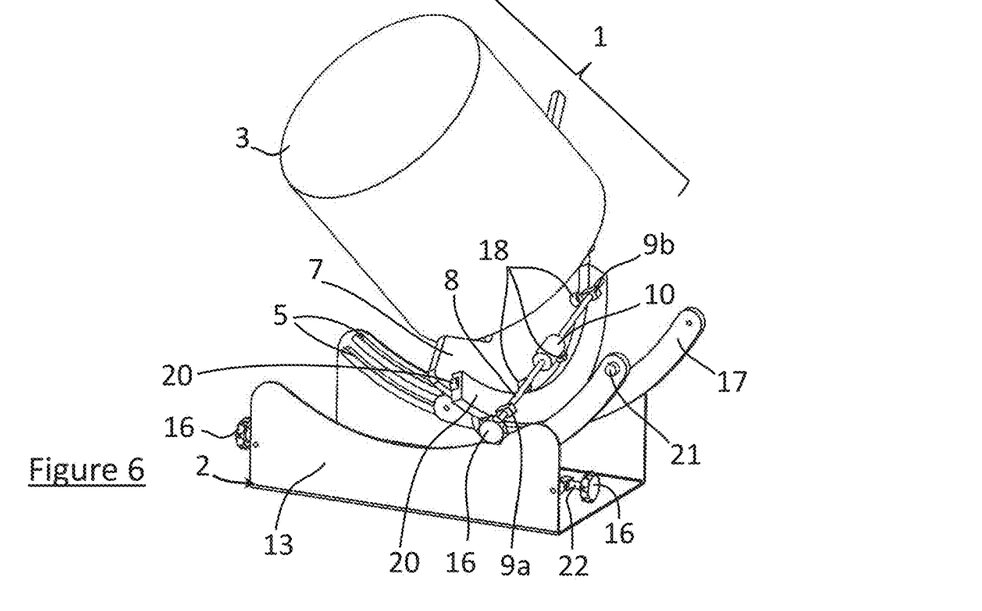
FIGS. 6 and 7: side views of a machine according to a second embodiment of the invention comprising an addi
Figure 7:
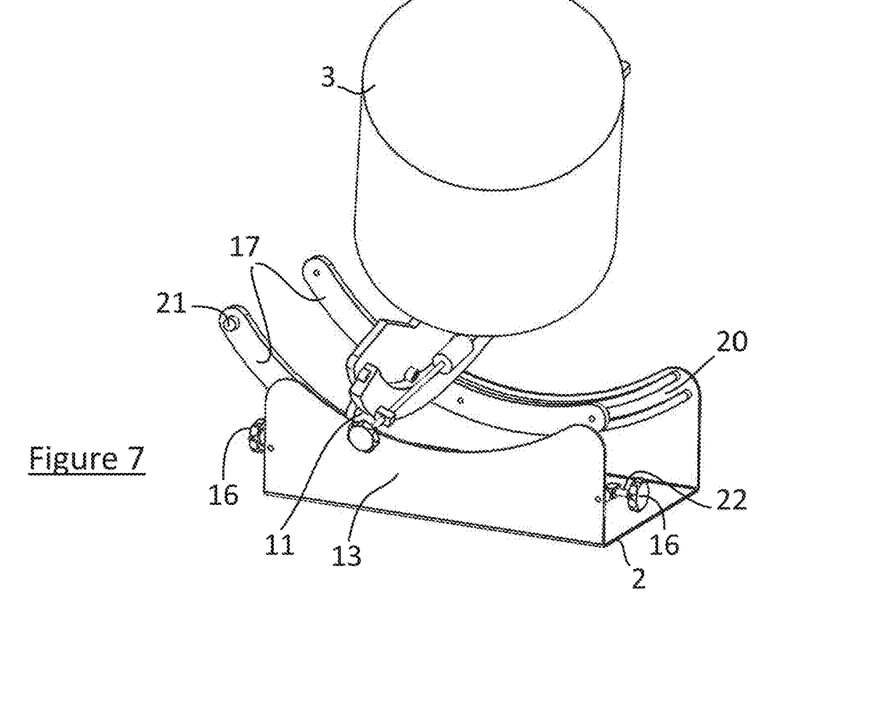

According to a first alternative illustrated in FIGS. 6 and 7, the additional device for adjusting the inclination comprises a rack 15 positioned on the arch 17 cooperating with a threaded rod 22 provided with at least one wheel 16. The action of the threaded rod 22 following a movement of the helical slide moves the rack 15 and thus the arch 17.

According to a second alternative illustrated in FIGS. 8 to 12, the additional device for adjusting the inclination comprises a rack 15 positioned on the arch 17 cooperating with the pinion 14 actuated by a crank 12. The rotation of the pinion 14 imparts a movement of translation of the rack 15 and thus the arch 17.

Preferably, the machine only comprises one additional adjustment device actuating the additional system; the second additional system follows the actuation of the additional system.

The examples of embodiments given for the adjustment device apply to the additional adjustment device and vice versa.

Figure 9:
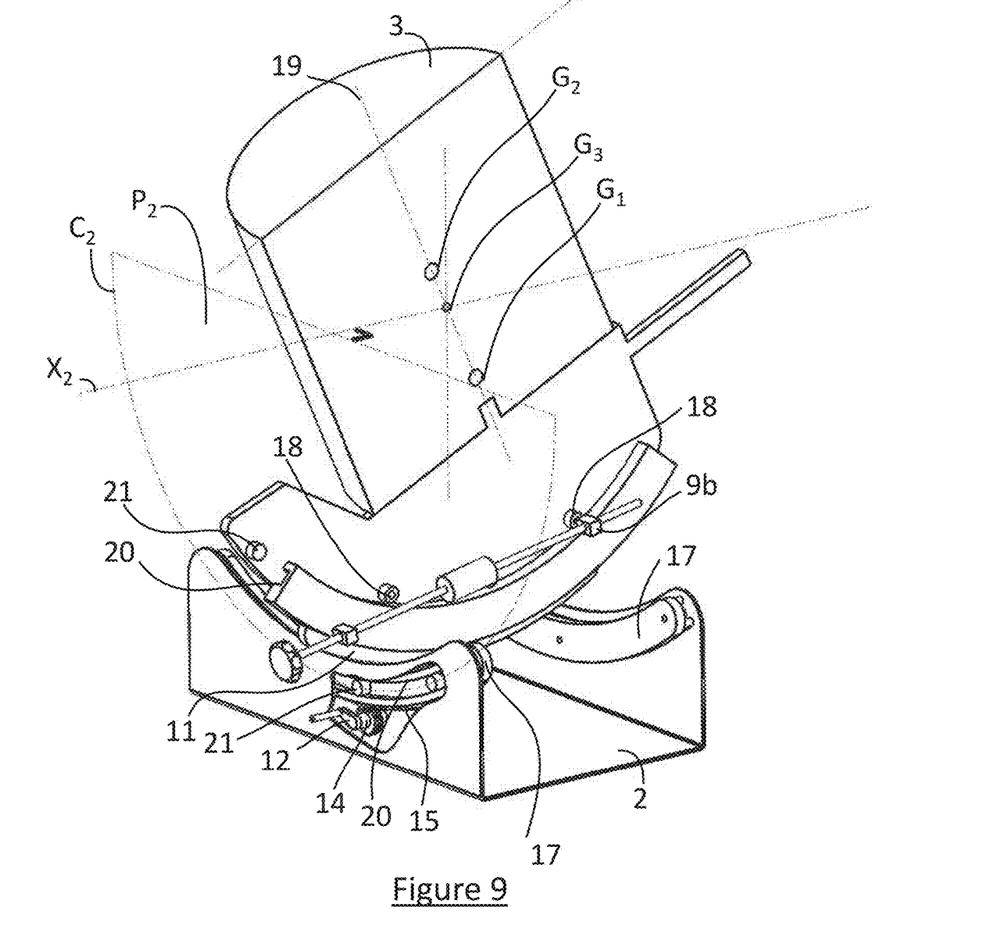
FIG. 9: Front view of a machine according to an alternative of the second embodiment illustrated in FIGS. 6 and 7, illustrating the additional mobility of the additional tilting mechanism.
Figure 10:
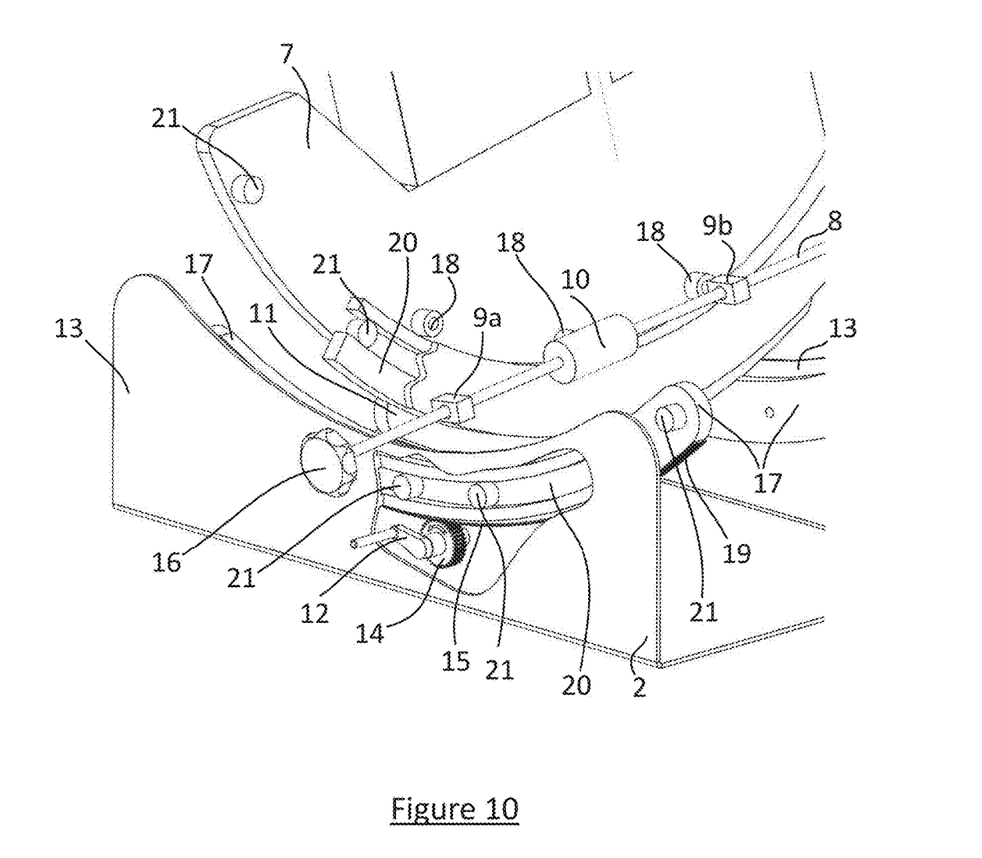
FIG. 10: Detailed view of the tilting mechanism and of the additional tilting mechanism.
Figure 11:
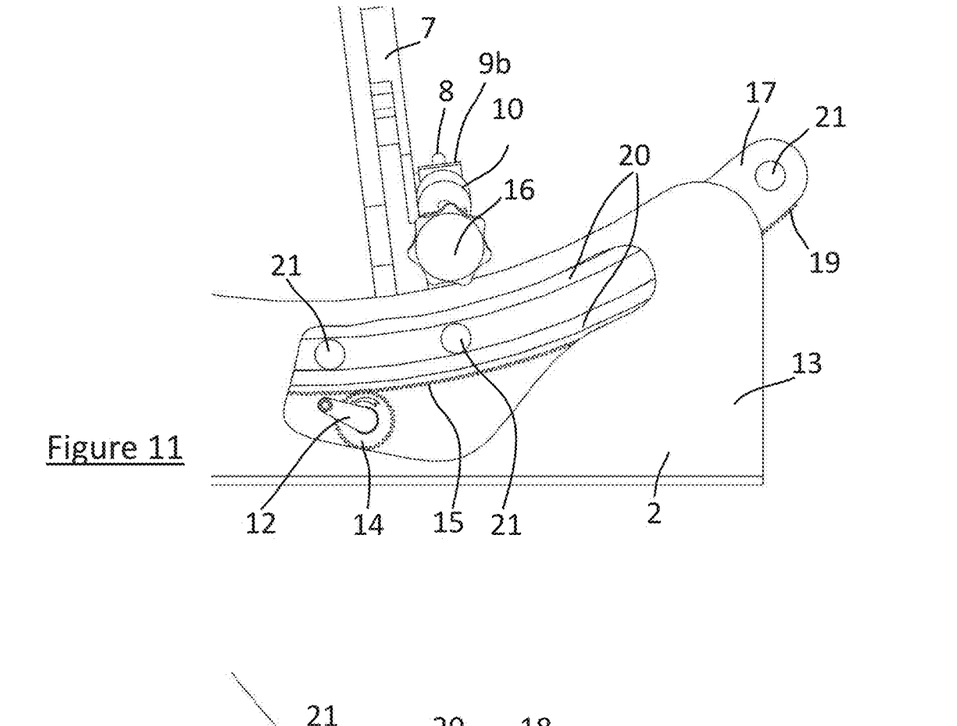
FIGS. 11 and 12: Detailed views of the additional tilting mechanism in a side view in FIG. 11 and in a front view in FIG. 12.
Figure 12:
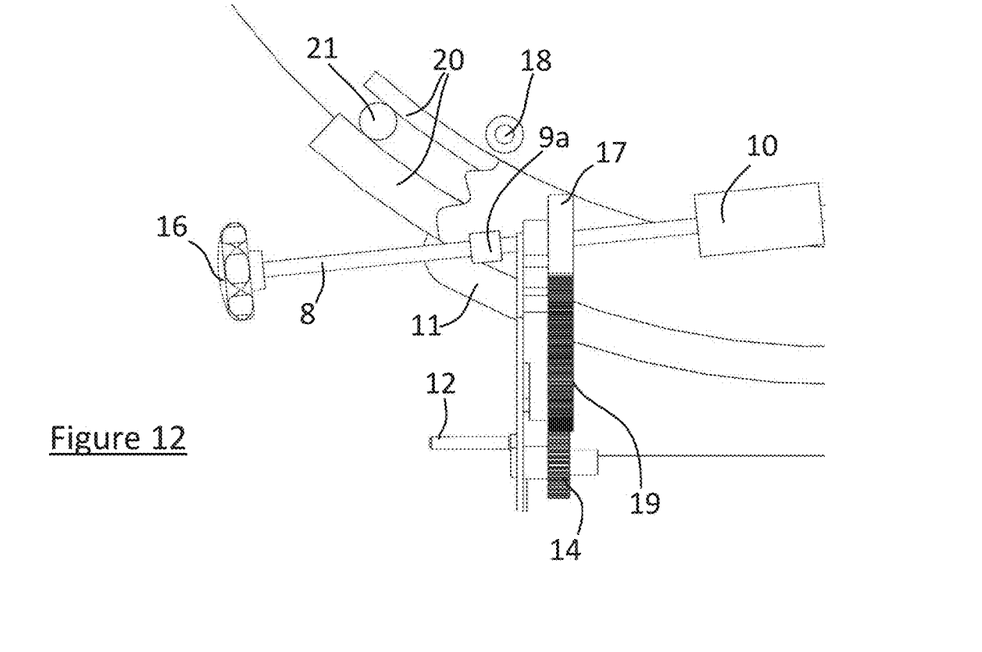

The additional system, and optionally the second additional system, is configured to impart a translation on the assembly along a curve C2 as illustrated in FIG. 9.

The curve C2 is, according to a preferred embodiment, an arc of a circle. The curve C2 is inscribed in a plane P2 advantageously comprising the longitudinal axis 19 of the machine. The curve C2 is centred on an axis X2 perpendicular to the plane P2 and intersecting the longitudinal axis 19 at the point G3.

The two mobilities of the tilting system are centred on the same point G3. The planes P1 and P2 are perpendicular in such a way that the tilting of the assembly relative to the base 2 can be carried out in two perpendicular directions.

The curves C1 and C2 are adapted in such a way as to choose the positioning of G3 in such a way as to facilitate the inclination of the assembly and without requiring a pivot link, more precisely a rotary shaft.

According to the invention, the assembly is mobile relative to the base 2 according to an articulation centred on G3.

REFERENCES

1. Assembly
2. Base
3. Drum
4. Rotary shaft
5. Oblong hole
6. Protruding portion
7. Launch mechanism
8. Threaded rod
9. a. nut
   b. bearing
10. Sleeve
11. Intermediate base
12. Crank
13. Flange
14. Pinion
15. Rack
16. Wheel
17. Arch
18. Stud
19. Longitudinal axis of the machine
20. Slide
21. Roller
22. Threaded rod
G1. Centre of gravity of the launch device when the drum is empty
G2. Centre of gravity of the launch device when the drum is full
G3. Pivot point of the device
C1. Curve of the base 1
C2. Curve of the base 2
P1. Plane in which the curve C1 is inscribed
P2. Plane in which the curve C2 is inscribed
X1. Axis perpendicular to P1, passing through G3
X2. Axis perpendicular to P2, passing through G3

The invention claimed is:

1. A machine for launching targets, comprising:
   a base;
   an assembly including a launch mechanism and a drum for storing targets, the assembly being arranged on the base and being configured to be mobile with respect to the base, wherein the drum is mounted for rotation about an axis and includes a plurality of target receiving columns parallel to each other; and
   a tilting mechanism comprising a main tilting system providing a main mobility of the assembly with respect to the base,
   wherein the main tilting system includes
      a curved slide rigidly connected to one out of the base and the assembly, and
      an element guided by the slide in one degree of tilting freedom along the slide and rigidly connected to the other out of the base and the assembly,
   wherein the main tilting system is configured to allow the main mobility of the assembly with respect to the base in rotation about a first axis of rotation and does not include a pivot link at the first axis of rotation,
   wherein the main tilting system is configured to impart a tilting of the assembly relative to the base according to a curve of the curved slide that is centered on a straight line, the straight line intersecting, at a point, a longitudinal axis of the machine that passes through a first center of gravity of the machine when the drum is empty and through a second center of gravity of the machine when the drum is full, and
   wherein the curve is configured to cause the point to be formed at a height level located between the first center of gravity of the machine and the second center of gravity of the machine.

2. The machine according to claim 1, wherein
   the tilting mechanism comprises an additional system providing an additional mobility of the assembly with respect to the base, and
   the additional system includes an additional curved slide rigidly connected to one out of the base and the assembly, and an additional element guided by the additional curved slide in one degree of tilting freedom along the additional curved slide and rigidly connected to the other out of the base and the assembly, the additional curved slide and the additional guided element being mounted movably in terms of tilting along the additional curved slide.

3. The machine according to claim 2, wherein the additional system is configured to provide the additional mobility of the assembly relative to the base in rotation about a second axis of rotation and does not comprise a pivot link at the second axis of rotation.

4. The machine according to claim 2, wherein the main tilting system and the additional system are mounted in series between the base and the assembly.

5. The machine according to claim 2, wherein the tilting mechanism further comprises a second additional system including a second additional curved slide rigidly connected to one out of the base and the assembly, and a second additional element guided by the second additional curved slide in a single degree of freedom in tilting along the second additional curved slide and rigidly connected to the other out of the base and the assembly, the second additional curved slide and the second additional guided element being mounted movably in terms of tilting along the second additional curved slide.

6. The machine according to claim 5, wherein the additional element and the second additional element are arches comprising, respectively, a series of rollers respectively sliding in the additional curved slide and in the second additional curved slide.

7. The machine according to claim 6, wherein the additional system is configured to impart a tilting of the assembly relative to the base according to an additional curve centered on an additional straight line orthogonal to the additional curve and intersecting, at the point G3, the longitudinal axis of the machine that passes through the first center of gravity of the machine when the drum is empty and through the second center of gravity of the machine when the drum is full.

8. The machine according to the claim 7, wherein the additional curve is configured to cause the point to be formed on a segment between the first center of gravity and the second center of gravity.

9. The machine according to claim 7, wherein the additional curve is configured to cause a distance between the first center of gravity and the point to be greater than the a distance between the second center of gravity and the point.

10. The machine according to claim 5, further comprising a device for additional adjustment of the additional system and the second additional system.

11. The machine according to claim 10, wherein the device for additional adjustment includes a pinion, a rack, and an arch, wherein the pinion is rigidly connected to the base and configured to cooperate with the rack arranged on the arch.

12. The machine according claim 1, wherein the guided element comprises a series of rollers cooperating with the curved slide.

13. The machine according to claim 1, further comprising a main device for adjusting an inclination of the main tilting system, wherein the main device includes an adjustable helical slide slidingly fastened at (i) at least one point onto the curved slide and (ii) at least one point onto the one out of the base and the assembly to which the guided element is rigidly connected.

14. The machine according to claim 1, wherein the curve of the curved slide is configured to cause a distance between the first center of gravity and the point to be greater than a distance between the second center of gravity and the point.

* * * * *